(12) United States Patent
Sadowski

(10) Patent No.: US 11,481,198 B2
(45) Date of Patent: Oct. 25, 2022

(54) FRAMEWORK FOR AUTOMATED GENERATION OF QUBO OR HIGHER ORDER FORMULATIONS FROM HIGH-LEVEL SOURCE CODE

(71) Applicant: Fujitsu Limited, Kawasaki (JP)

(72) Inventor: Przemyslaw Sadowski, Middlesex (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/410,408

(22) Filed: Aug. 24, 2021

(65) Prior Publication Data

US 2022/0066750 A1   Mar. 3, 2022

(30) Foreign Application Priority Data

Aug. 26, 2020   (EP) .................................... 20192876

(51) Int. Cl.
*G06F 8/40* (2018.01)
(52) U.S. Cl.
CPC ...................................... *G06F 8/40* (2013.01)
(58) Field of Classification Search
CPC ............... G06F 8/40; G06F 8/41; G06F 8/443
See application file for complete search history.

(56) References Cited

U.S. PATENT DOCUMENTS

| | | |
|---|---|---|
| 10,223,084 B1 | 3/2019 | Dunn |
| 2012/0045136 A1 | 2/2012 | Rose |

(Continued)

FOREIGN PATENT DOCUMENTS

| | | |
|---|---|---|
| WO | 2017/152289 A1 | 9/2017 |
| WO | 2017/214293 A1 | 12/2017 |

OTHER PUBLICATIONS

T. Vyskocil and H. Djidjev, "Constraint Embedding for Solving Optimization Problems on Quantum Annealers," 2019 IEEE International Parallel and Distributed Processing Symposium Workshops (IPDPSW), 2019, pp. 635-644, doi: 10.1109/IPDPSW.2019.00109. (Year: 2019).*

(Continued)

*Primary Examiner* — Hanh Thi-Minh Bui
(74) *Attorney, Agent, or Firm* — Staas & Halsey LLP

(57) ABSTRACT

Method of inputting code into information processing apparatus requiring code of polynomial format of order k which comprises translating the code into a polynomial of order k; encoding each decision variable in the code, and obtaining mappings between the encoded variables and the polynomial variables; extracting an expression representing interrelationships between the decision variables and polynomial subfunctions; generating first polynomial portions for subfunctions whose output is not the input for another subfunction. The method includes generating second polynomial portions for subfunctions whose output is the input for another subfunction, reducing the order of terms higher than floor(k/2) in the second polynomial portion to floor(k/2) with associated order reduction penalties, and creating an auxiliary variable equal to the second polynomial portion with an auxiliary penalty; and obtaining a polynomial formulation for input into the apparatus by accumulating the first polynomial portions, auxiliary variables and penalties, and order reduction penalties.

15 Claims, 9 Drawing Sheets

(56) References Cited

U.S. PATENT DOCUMENTS

| | | |
|---|---|---|
| 2014/0025606 A1 | 1/2014 | Macready |
| 2017/0177751 A1 | 6/2017 | Macready et al. |
| 2017/0255872 A1 | 9/2017 | Hamze et al. |
| 2018/0308007 A1 | 10/2018 | Amin |
| 2020/0409918 A1* | 12/2020 | Mandal .................. G06N 5/022 |

OTHER PUBLICATIONS

Nike Dattani "Quadratization in Discrete Optimization and Quantum Mechanics" An open source Book on quadratizations for classical computing, quantum annealing, and universal adiabatic quantum computing. arXiv:1901.04405v2 [quantum-ph] Sep. 23, 2019 (83pages).

Extended European Search Report dated Mar. 1, 2021 in corresponding European Patent Application No. 20192876.9 (12 pages).

Scott Pakin; "Targeting Classical Code to a Quantum Annealer"; Architectural Support for Programming Languages and Operating Systems, Apr. 4, 2019; ACM, New York, NY; Apr. 4, 2019; pp. 529-543; (15 pages).

Scott Pakin; "A Quatum Macro Assembler"; Computer, Computational, and Statistical Sciences Division, Los Alamos National Laboratory, Los Alamos, NM; 978-1-5090-3525-0/16 2016 IEEE; retrieved on Nov. 28, 2016; (8 pages).

Sao Masataka et al: "Application of Digital Annealer for Faster Combinatorial Optimization", Fujitsu Scientific & Technical Journal (English Version), vol. 55, No. 2, Jan. 1, 2019 (Jan. 1, 2019), pp. 45-51, XP055652152.

Georg Hahn et al.: "Reducing Binary Quadratic Forms for More Scalable Quantum Annealing"; 2017 IEEE International Conference on Rebooting Computing (ICRC); IEEE, Nov. 8, 2017; pp. 1-8; XP033273698; retrieved on Nov. 28, 2017; (8 pages).

\* cited by examiner

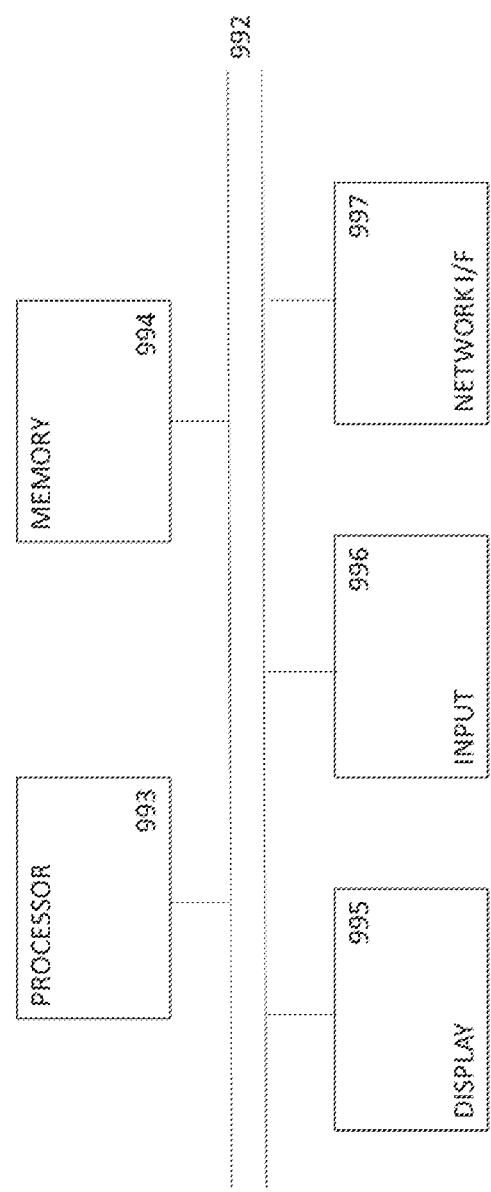

FRAMEWORK FOR AUTOMATED GENERATION OF QUBO OR HIGHER ORDER FORMULATIONS FROM HIGH-LEVEL SOURCE CODE

CROSS-REFERENCE TO RELATED APPLICATION(S)

This application is based on and hereby claims priority to European Patent Application No. 20192876.9, filed Aug. 26, 2020, in the European Patent Office, the disclosure of which is incorporated herein by reference.

FIELD

Embodiments relate to a framework for automated generation of Quadratic Unconstrained Binary Optimization (QUBO) or higher order formulations from high-level source code.

BACKGROUND

Embodiments may be applied in any field where an information processing algorithm translates source code into a polynomial. By way of example only, one such application is in the field of optimization. Optimization is the process of finding the best (or close to the best) solution from a set of possible solutions. Combinatorial optimization is a subset of optimization which consists of finding an optimal (or close to optimal) object in a finite set of objects. Examples of combinatorial optimization problems are task scheduling, vehicle routing, portfolio optimization, only to name a few. Most combinatorial optimization problems are very hard to solve in the sense that it would take an impractical amount of time (e.g. years, millennia or more) to obtain the exact optimum. As such, many approximation techniques that obtain a close approximation (usually within a few percent of the exact optimum), but in a practical amount of time (e.g. seconds, minutes, hours or days), have been devised. Examples of such approximate techniques are Simulated (Quantum) Annealing or Evolutionary Optimization.

QUBO (also known as Unconstrained Binary Quadratic Programming, UBQP), is a model of optimization problems that has been intensively studied for at least four decades. The model assumes that there is a search space described by binary variables, and an objective function given in a form of a quadratic polynomial. Without loss of generality the search space may be described by n binary variables $x_i$, i=1, . . . , n and the objective function given as $$f(x_1, \ldots, x_n) = \sum_{i=1, j=1}^{n} a_{i,j} x_i x_j,$$

where $a_{i,j}$ are the QUBO coefficients. The coefficients completely define the optimization problem.

There are two main focuses of research related to the model. First, studying optimization algorithms' properties using QUBO problems as a testbed. Second, applying QUBO to model real world problems that naturally fit into the model.

The field of building QUBO representations of optimization problems that do not naturally fit into this model has gained some interest very recently. The main motivation of the community is to generate correct input for special purpose machines that solve Ising Model problems only.

These so-called Ising Machines (also called annealers) are computers capable of very quickly and efficiently solving certain classes of combinatorial optimization problems. Such specialized computing architecture may provide orders of magnitude speedup when solving combinatorial optimization problems. However, these kinds of machines have appeared very recently, and very few provide sufficient scale that would make them useful for solving real world challenges.

Descriptive QUBO creation is the creation of a QUBO representation from source code that is not equations-based. A previously-proposed technique for descriptive QUBO creation for high order functions (i.e. order/degree greater than two) builds the high order function coefficient by coefficient, which means that its complexity is directly linked to the number of coefficients of the function for a given order. For a quadratic function the number of coefficients is $O(N^2)$, where N is the number of binary variables. For a function with order k the number of coefficients is $O(N^k)$. For large scale problems this means that the previously-proposed approach for obtaining third order coefficients is usually already very time-consuming.

The only existing workaround is to manually extend the problem, adding auxiliary variables to the solution description, and extending the objective function to use the auxiliary variables to correctly reduce the order of the complete objective function. The main problem with this approach is that the procedure relies on expertise of the user to decide what kind of auxiliary variable, and how, should be introduced. Thus a clear procedure that might be followed by a non-expert user, let alone an automated procedure, does not exist.

SUMMARY

According to an embodiment, a computer-implemented method of automatically inputting code into an information processing apparatus is provided where the apparatus requires input code to be in a predefined polynomial format of order k, where k≥2. The method comprising: receiving source code (for example, modular high-level source code not in the predefined polynomial format) for input into the information processing apparatus; translating the source code into a polynomial of order k, where each subfunction of the source code is translated into a new subfunction independently of each other subfunction of the source code; analyzing the source code to extract information about the types of decision variables in the source code, applying an encoding to each of the decision variables, and obtaining mappings between the encoded variables and variables of the polynomial; extracting from the source code and the new subfunctions an expression representing interrelationships between the decision variables and the new subfunctions.

The method includes generating a corresponding first polynomial portion for each new subfunction where the output of the new subfunction is not the input for another of the new subfunctions; generating a corresponding second polynomial portion for each new subfunction where the output of the new subfunction is the input for another of the new subfunctions, wherein: when the second polynomial portion generated for that new subfunction has any term of order higher than floor(k/2), that term in the second polynomial portion is reduced in order to floor(k/2), and an associated order reduction penalty of order k is generated; and an auxiliary variable equal to the second polynomial portion is created to store the output of the second polynomial portion, and an associated auxiliary penalty of order k is generated; and obtaining a polynomial formulation for input into the information processing apparatus by accumulating the first polynomial portions, together with any auxiliary variables and associated auxiliary penalties and any order reduction penalties, using the extracted expression and mappings to link the new subfunctions of the polynomial to the decision variables in the source code.

Obtaining the polynomial formulation may include removing any unnecessary inefficiencies in the polynomial formulation. Removing any unnecessary inefficiencies may comprise ascertaining whether any auxiliary variable created to store the output of a second polynomial portion is used in the polynomial formulation only in a term of order lower than or equal to floor(k/2), and replacing any such auxiliary variable and associated auxiliary penalty in the polynomial formulation by the corresponding second polynomial portion. Alternatively or additionally, removing any unnecessary inefficiencies may comprise ascertaining whether any reduced order term in a second polynomial portion is not used in the polynomial formulation as the input to another term, and replacing any such term and associated order reduction penalty in the polynomial formulation by the corresponding higher order term.

An embodiment includes a computer program which, when run on a computer, causes that computer to carry out a method embodying the one or more of the embodiments described herein.

An embodiment includes data input apparatus to automatically input code into an information processing apparatus, the information processing apparatus requiring input code to be in a predefined polynomial format of order k, where $k \geq 2$, the data input apparatus comprising: at least one processor to receive source code for input into the information processing apparatus; and at least one memory to store instructions to cause the at least one processor to: translate the source code into a polynomial of order k, where each subfunction of the source code is translated into a new subfunction independently of each other subfunction of the source code; analyze the source code to extract information about the types of decision variables in the source code, apply an encoding to each of the decision variables, obtain mappings between the encoded variables and variables of the polynomial, and store the extracted information and mappings in memory; extract from the source code and the new subfunctions an expression representing interrelationships between the decision variables and the new subfunctions, and store the extracted expression in memory; generate a corresponding first polynomial portion for each new subfunction, where the output of the new subfunction is not the input for another of the new subfunctions, and store the generated first polynomial portion in memory, generate a corresponding second polynomial portion for each new subfunction, where the output of the new subfunction is the input for another of the new subfunctions, and store the generated second polynomial portion in memory. When the second polynomial portion generated for that new subfunction has any term of order higher than floor(k/2), that term in the second polynomial portion is reduced in order to floor(k/2), and an associated order reduction penalty of order k is generated and stored in memory; and an auxiliary variable equal to the second polynomial portion is created to store the output of the second polynomial portion, an associated auxiliary penalty of order k is generated, and the auxiliary variable and associated auxiliary penalty are stored in memory. According to an embodiment, the at least one processor obtains a polynomial formulation for input into the information processing apparatus by accumulating the stored first polynomial portions, together with any stored auxiliary variables and associated auxiliary penalties and any stored order reduction penalties, using the stored extracted expression and mappings to link the new subfunctions of the polynomial to the decision variables in the source code.

In obtaining the polynomial formulation, the processor may remove any unnecessary inefficiencies in the polynomial formulation. The processor may ascertain whether any auxiliary variable created to store the output of a second polynomial portion is used in the polynomial formulation only in a term of order lower than or equal to floor(k/2), and replace any such auxiliary variable and associated auxiliary penalty in the polynomial formulation by the corresponding second polynomial portion. Alternatively or additionally, the processor may ascertain whether any reduced order term in a second polynomial portion is not used in the polynomial formulation as the input to another term, and replace any such term and associated order reduction penalty in the polynomial formulation by the corresponding higher order term.

In one or more of the embodiments the source code may represent an optimization problem.

In one or more of the embodiments the information processing apparatus may be an Ising machine.

In one or more of the embodiments order k may be two and the predefined polynomial format may be a Quadratic Unconstrained Binary Optimization formulation.

Some embodiments provide a solution to the problem of translating modular high-level source code into a QUBO representation (Descriptive QUBO Creation).

Embodiments provide a meta-programming framework that includes a novel way of storing and processing functions defined by a user. Based on that framework an automated method is proposed that is an alternative to a standard manual way of obtaining a QUBO formulation from a high-level description.

Embodiments provide a solution for descriptive QUBO and higher order creation that works with full scale real-world modular high-level source code. In particular, this makes the use of Ising machines easier, and thus suitable for a larger group of end users.

Although discussed in relation to high order optimization problems, the proposed system may be applied in any context where a function given as a source code needs to be translated into a mathematical formula in the form of a polynomial on a specified field, for example feature extraction in machine learning applied to code analysis.

In this application an example developed for constructing polynomials on a real numbers field with non-zero coefficients restricted to the second order is explained. Equivalently the non-zero coefficients restriction may be described by a complete graph with vertices corresponding to the indices of the variables. However the architecture is generic with regard to these features.

For example, an embodiment could be applied to a higher order polynomial with non-zero coefficients restricted to a certain hyper-graph. For a hyper-graph of order three, this will likely be the requirements for running optimization procedures on some of the Quantum Annealer architectures that might be available in the future.

BRIEF DESCRIPTION OF THE DRAWINGS

These and/or other aspects and advantages will become apparent and more readily appreciated from the following description of the embodiments, taken in conjunction with the accompanying drawings. Reference will now be made, by way of example, to the accompanying drawings, in which:

FIG. 8 is a block diagram of a computing device suitable for carrying out a method according to an embodiment.

DETAILED DESCRIPTION

Figure 1A:
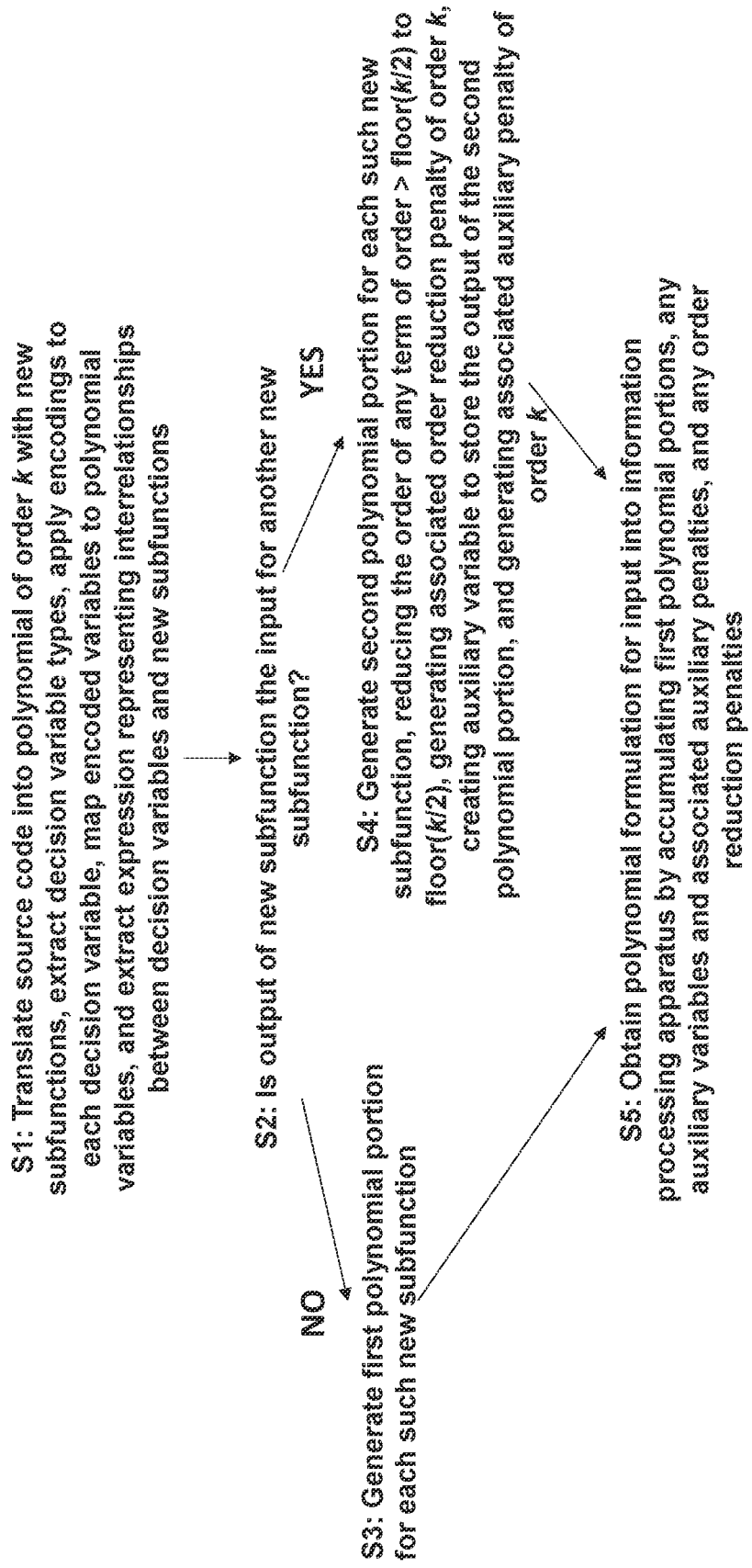
FIG. 1A is a flowchart of a method according to an embodiment.

Reference will now be made in detail to the present embodiments of the present invention, examples of which are illustrated in the accompanying drawings, wherein like reference numerals refer to the like elements throughout. The embodiments are described below to explain the present invention by referring to the figures. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1B:
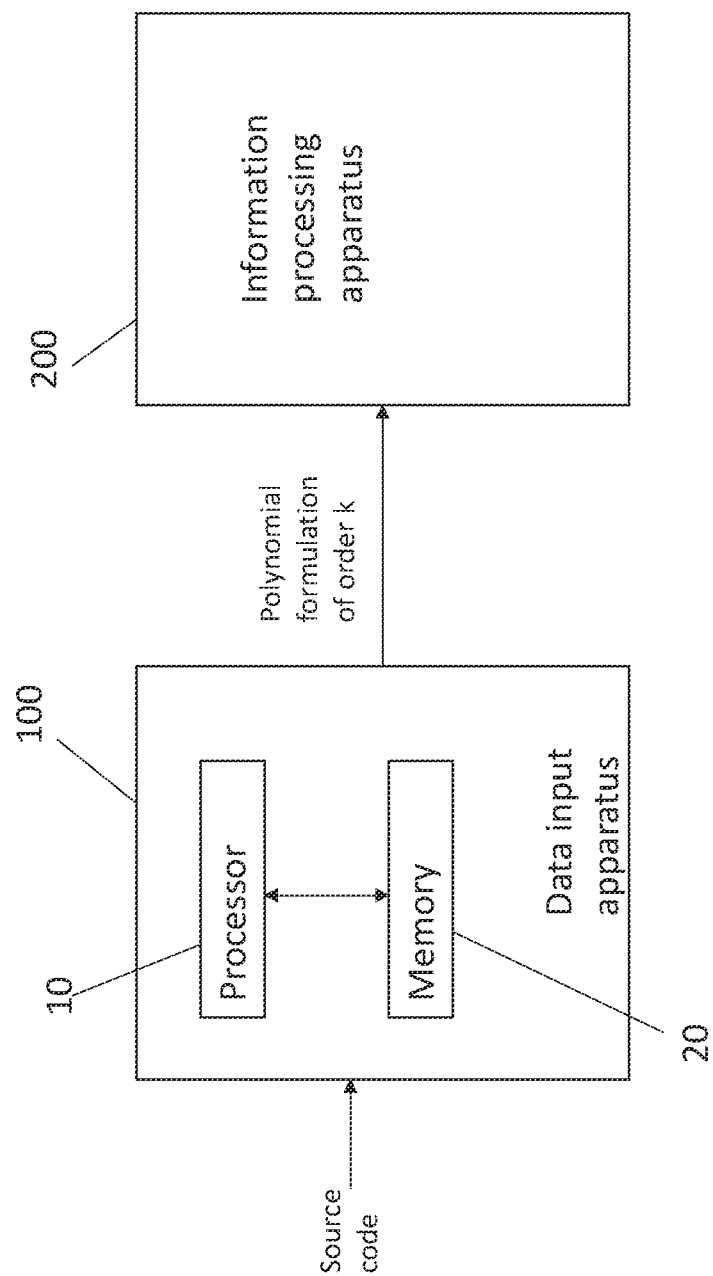
FIG. 1B is a block diagram of a data input apparatus according to an embodiment.

FIG. 1A is a flowchart of a computer-implemented method of automatically inputting code into an information processing apparatus 200, the apparatus 200 requiring input code to be in a predefined polynomial format of order k, where k≥2. The method illustrated in FIG. 1A may be carried out by data input apparatus 100, having a processor 10 and memory 20, as shown in FIG. 1B.

At operation S1 the source code is translated into a polynomial of order k, each subfunction of the source code being translated into a new subfunction independently of each other subfunction of the source code. The source code is analyzed to extract information about the types of decision variables in the source code, an encoding is applied to each of the decision variables, and mappings between the encoded variables and variables of the polynomial are obtained. An expression representing interrelationships between the decision variables and the new subfunctions is extracted from the source code and the new subfunctions.

At operation S2 it is determined whether the output of a new subfunction is the input for another of the new subfunctions.

If it is not, at operation S3 a corresponding first polynomial portion is generated for the new subfunction.

However, if it is, at operation S4 a corresponding second polynomial portion is generated for the new subfunction. If the second polynomial portion has any term of order higher than floor(k/2), that term in the second polynomial portion is reduced in order to floor(k/2), and an associated order reduction penalty of order k is generated. In addition, an auxiliary variable equal to the second polynomial portion is created to store the output of the second polynomial portion, and an associated auxiliary penalty of order k is generated.

At operation S5 a polynomial formulation for input into the information processing apparatus is obtained by accumulating the first polynomial portions, together with any auxiliary variables and associated auxiliary penalties and any order reduction penalties. The extracted expression and mappings are used to link the new subfunctions of the polynomial to the decision variables in the source code. Obtaining the polynomial formulation may include removing any unnecessary inefficiencies in the polynomial formulation. For example, if any auxiliary variable created to store the output of a second polynomial portion is used in the polynomial formulation only in a term of order lower than or equal to floor(k/2), any such auxiliary variable and associated auxiliary penalty is replaced in the polynomial formulation by the corresponding second polynomial portion. Similarly, if any reduced order term in a second polynomial portion is not used in the polynomial formulation as the input to another term, and any such term and associated order reduction penalty in the polynomial formulation is replaced by the corresponding higher order term.

Figure 2:
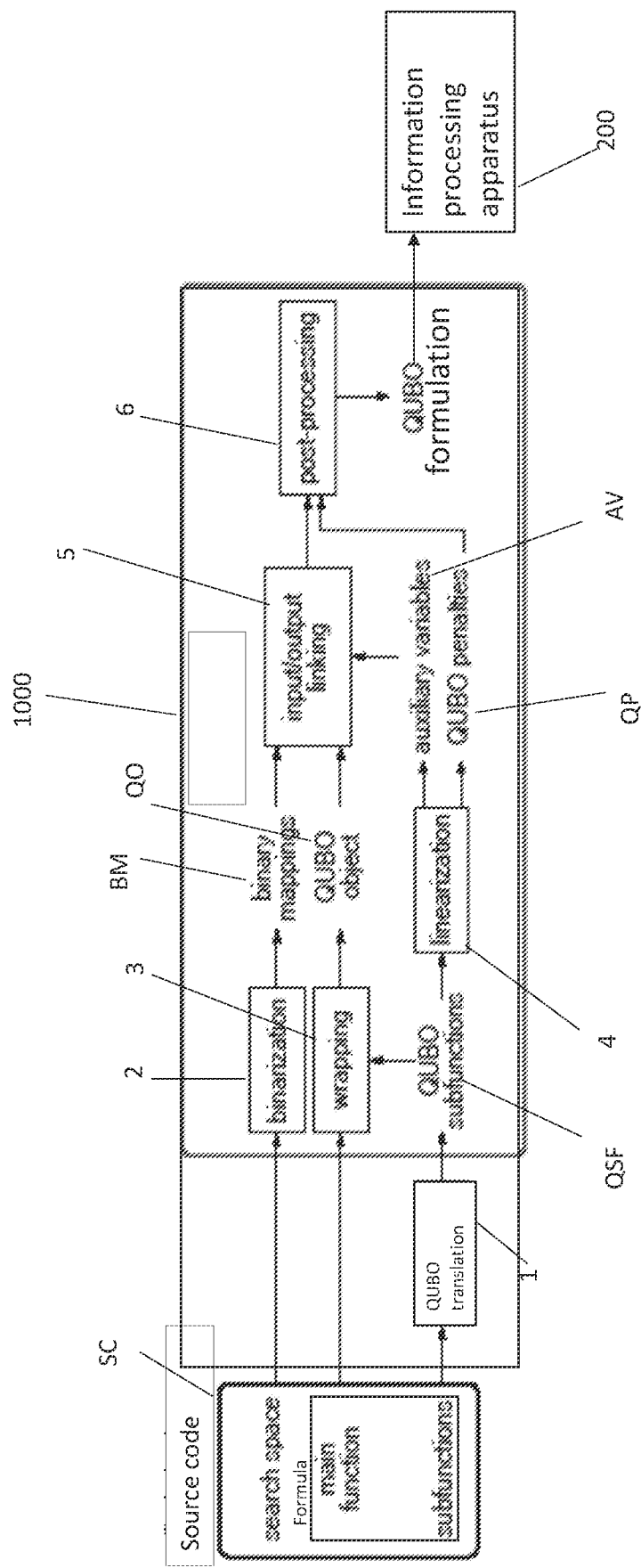
FIG. 2 is a block diagram of the architecture of an embodiment for obtaining code in QUBO format.

The architecture 1000 of an embodiment for obtaining code in QUBO format from high-level modular source code SC is shown in FIG. 2. Source code SC is input into QUBO translation module 1 which translates source code SC into subfunctions QSF of a core QUBO representation (comprising a constant coefficient, linear coefficients and quadratic coefficients) using any appropriate known method.

Source code SC is also input into binarization module 2 and wrapping module 3, the latter also receiving the QUBO subfunctions QSF and outputs a QUBO object QO.

Binarization module 2 analyzes the source code SC to extract information about the types of decision variables, applies a standard binary encoding to each of the variables, and then maps the binary variables needed for the encoding to the binary variables of the core QUBO representation. The resulting binary mappings BM are then output.

Wrapping module 3 extracts the relationships between decision variables and subfunctions. For example, the objective function is extracted and wrapped in an object that will analyze the relationships between decision variables and subfunctions when the function is run. In the worked example described below it is assumed that the source code follows a particular template, thus running it will generate an appropriate object.

The QUBO subfunctions QSF are also input into linearization module 4 which outputs auxiliary variables AV and QUBO penalties QP. In particular, linearization module 4 applies an order reduction method to those of the QUBO subfunctions QSF which are themselves the input for another of the QUBO subfunctions QSF to obtain a linear representation AV, QUBO penalties QP being created as a by-product of the order reduction method. In general any standard order reduction method may be used (for example, as described in I. G. Rosenberg, "Reduction of Bivalent Maximization to the Quadratic Case," Cahiers du Centre d'Etudes de Recherche Operationnelle 17, 71-74 (1975). In the worked example described below the linearization results are used when a link between subfunctions is created (see operation 3 of Algorithm 1 below).

Auxiliary variables AV are input into input/output linking module 5, together with binary mappings BM and QUBO object QO. The goal of this module is to link the input variables in the abstract description of the subfunctions to particular binary variables of the core QUBO representation, using the binary mappings BM and the auxiliary variables AV output from the previous subfunctions. The output of input/output linking module 5 is a preliminary core QUBO formulation. In the worked example described below, in input/output linking module 5 Algorithm 1 (described below) is applied to each of the links.

The preliminary core QUBO formulation which is the output of input/output linking module 5 is input into post-processing module 6 together with the QUBO penalties QP. Post-processing module 6 outputs the required QUBO formulation in the format required by information processing apparatus 200. The purpose of such post-processing optimization is to eliminate any inefficiency (i.e. unnecessary variables and corresponding terms) in the preliminary core QUBO formulation that it was impossible (without gathering the complete information) to predict with certainty during the previous phases. In the worked example described below, post-processing optimization includes reversing the effects of linearization if it proves to have been unnecessary, and reversing the introduction of auxiliary variables where they prove to have been unnecessary.

Figure 3:
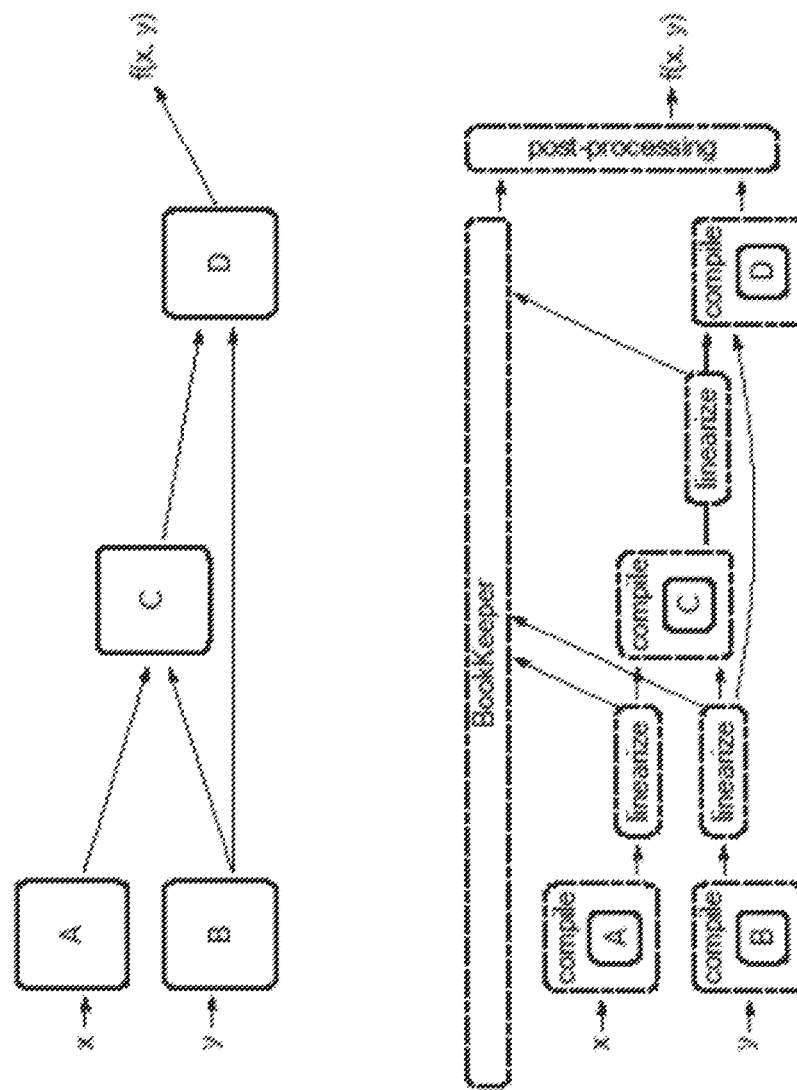
FIG. 3 is a block diagram illustrating the processing of an example of optimization problem data in accordance with an embodiment.

FIG. 3 is a block diagram illustrating the processing of an example of optimization problem data in accordance with an embodiment. The upper part of FIG. 3 shows an example of a structure extracted from source code SC with decision variables x, y as input to QSF A and QSF B respectively, the outputs of QSF A and QSF B as inputs to QSF C, the outputs of QSF B and QSF C as inputs to QSF D, and the value of function f(x, y) as the output of QSF D. The lower part of FIG. 3 shows an example of the above-mentioned processes applied to the subfunctions QSF A, B, C and D obtained from source code SC as shown in the upper part of FIG. 3.

The embodiment illustrated in FIG. 2 carries out a set of processes for processing user-defined functions in such a way that the structure of an underlying problem to be solved may be automatically extracted and reformulated into a formulation of a desired order (QUBO in this example). The processes in the embodiment comprise:
  Wrapping the functions into novel representation datatypes (i.e. automatically substituting the auxiliary functions with objects newly developed for this purpose in such a way that there is no change in the way they are used), allowing the user to use the output as if it was just a function
  Storing quadratic or higher order formulas in auxiliary variables, to ensure that the whole formula is of the desired order
  Using Python annotations to automatically extract information about variable types (which may be required for correct variable binarization input to a suitable translation engine), and just in time compilation (i.e. the user writes the code and runs it without doing any compilation manually, compilation happening automatically at run time of the program). For example, in the working example described below, it is assumed that there is a description of the solution space which includes decision variables and their type, e.g. qubo.x=uint32. Standard binary encoding methods may be used to create a mapping between original decision variables and the binary variables of QUBO
  Compiling every auxiliary function as if the input variables were a formula
  Allowing the parts of the QUBO to be joined in an inefficient but simple way that may be improved during post-processing Wrapping the Functions into Novel Representation Data Types It is desirable to develop a framework for processing user-defined functions in such a way that at the same time the processing is transparent to the user—otherwise a readable high-level description will no longer be accepted as input—and all the data necessary for compilation is extracted and stored.

However, with high-level descriptions, keeping track of all the core and book-keeping parts of the components (auxiliary functions) of the input code may quickly become very complex. This embodiment therefore uses a meta-programming approach to automatically substitute the components with new data type objects, which keeps all the necessary book-keeping transparent.

Storing Quadratic or Higher Order Formulas in Auxiliary Variables

One of the main challenges while translating a high order function is that, even if all of the components (auxiliary functions) given by the user are quadratic (or of the desired order), the result of putting them together is a function of higher order.

A standard existing way of obtaining a QUBO that is equivalent to a higher level function obtained from joining two or more quadratic modules/formulas is dependent on what kind of components are to be joined. For example, the usually recommended way is to generate all of the high level coefficients and perform reduction with some kind of optimization involved to decide the exact method. In contrast, in this embodiment the processing is exactly the same regardless of what exactly the user-defined function is. Since processing steps are standardized, the decision process and unpredictability of the intermediate stage data is minimized, which assists in automating the extraction and reformulation method.

In the present embodiment the data type used for storing user defined functions decouples the core part of the function from an auxiliary "book-keeping" part. This allows any function that is quadratic or higher order to be automatically translated into a linear core function and a quadratic "book-keeping" part. This order reduction of the core part enables high order functions to be created. The final QUBO description is the sum of the core part and the "book-keeping" part. The core part is the result of translating the input code explicitly defined by the user into QUBO (or the desired higher order) representations. The book-keeping part is everything else that is created automatically, which has not been explicitly provided by the user, but is necessary to develop a representation in the required format equivalent to the input description.

More generally, when the final polynomial is of order k, any function that is of order higher than floor(k/2) is reduced to a core function of order floor(k/2) and an associated "book-keeping" part of order k.

Using Annotations to Provide Signatures to Translation Engine, and Just in Time Compilation To perform compilation of a cost function of an optimization problem some meta-data is needed, together with the function's body. For an automated process a unified way to gather the necessary information is required (manual translation processes usually do not have to be concerned with gathering this information as it may be extracted manually one way or the other). It is necessary to be sure that the information required is always provided, or that the user may be easily prompted to provide it. In this embodiment annotations are used to provide signatures to the Translation Engine.

Dual Mode Compilation

In this embodiment the auxiliary variables are not optimized until the end of the process. To make this possible, data that indicates whether the introduced variables are necessary is required. This cannot be determined during processing a single auxiliary function, instead data about all the uses of the output are necessary. To determine if the variable needs to be stored in an auxiliary variable, the auxiliary function is always compiled as if the input variables were formulas (hereafter referred to as "dual mode compilation"). If the compilation succeeds, the input variables need to be stored in auxiliary variables. If the compilation fails, the output will be passed directly to the following functions as a formula during post-processing.

An additional benefit is that for some previously-proposed compilation methods the time complexity depends on how the input variables are interpreted. Once the compilation is successful, the output may be modified to be valid in a different context.

Detailed Embodiment

It is assumed that the modular high-level source code is created using a framework of a kind that makes the user follow basic guidelines regarding data types used and functions modularity. The language employed for the modular high-level source code description may be a general purpose object oriented programming language, such as Python, but may be any other suitable programming language (e.g. c++, c#, Java, etc.).

In object-oriented programming, a class is an extensible program-code-template for creating objects, providing implementations of behavior (methods). An instance (member) of a class is an object. A helper class is used in object-oriented programming to assist in providing some of the functionality which is not the main goal of the application or class in which it is used. An instance of a helper class is called a helper object. Its use in the context of the present embodiment is meant to mainly emphasize that the user does not interact with helper classes directly. The whole 'public' interface is in the main class.

Figure 4:
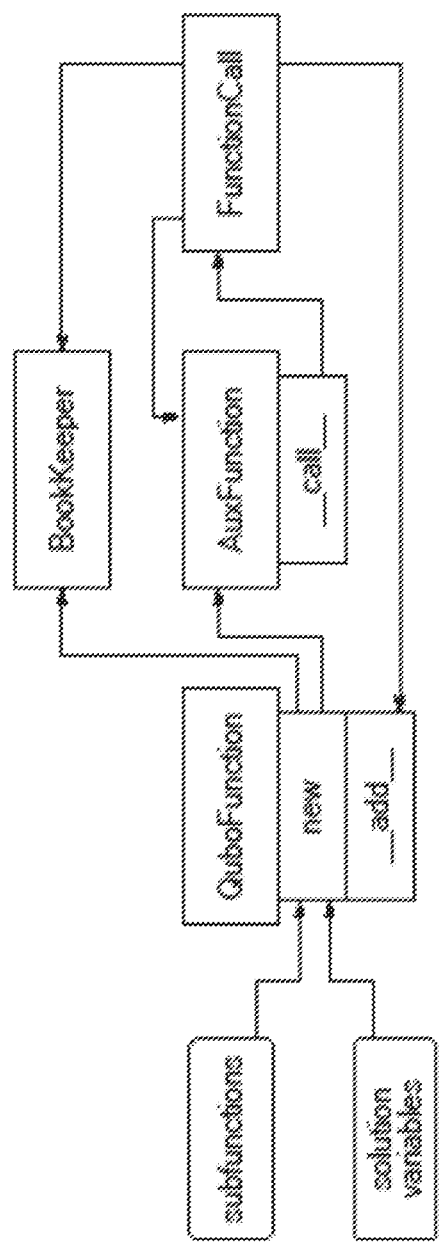
FIG. 4 is a diagram illustrating types of objects which may be used in an embodiment implemented using object-oriented programming.

In the present embodiment, as shown in FIG. 4, four main types of object are used:
  QuboFunction, is the main class, providing a user interface;
  BookKeeper, is a helper class, its purpose is to collect all the necessary data, handle the compilation of auxiliary functions, linearization etc.;
  AuxFunction, is a helper class, given a reference (e.g. the address in memory where the object is stored) to a user-defined function. When called by FunctionCall instance (see below) it performs arguments processing and initiates compilation. It also provides an interface for the QuboFunction class;
  FunctionCall, is a helper class, which handles the processing of the output of the AuxFunction class. It stores the arguments until the whole context is known. Depending on how the output is used, it either calls for linearization or not.

1.1 QuboFunction Object

QuboFunction object provides an interface for introducing new solution variables and new auxiliary functions, distinguishing the two automatically. If a function is given as input, an AuxFunction instance is created, as described below with reference to FIG. 5, which is a flowchart illustrating the process for collecting the elements of the problem to be translated into QUBO. The process of FIG. 5 corresponds to the tasks carried out by the QUBO translation module 1, binarization module 2 and wrapping module 3 that use the user's input directly.

Figure 5:
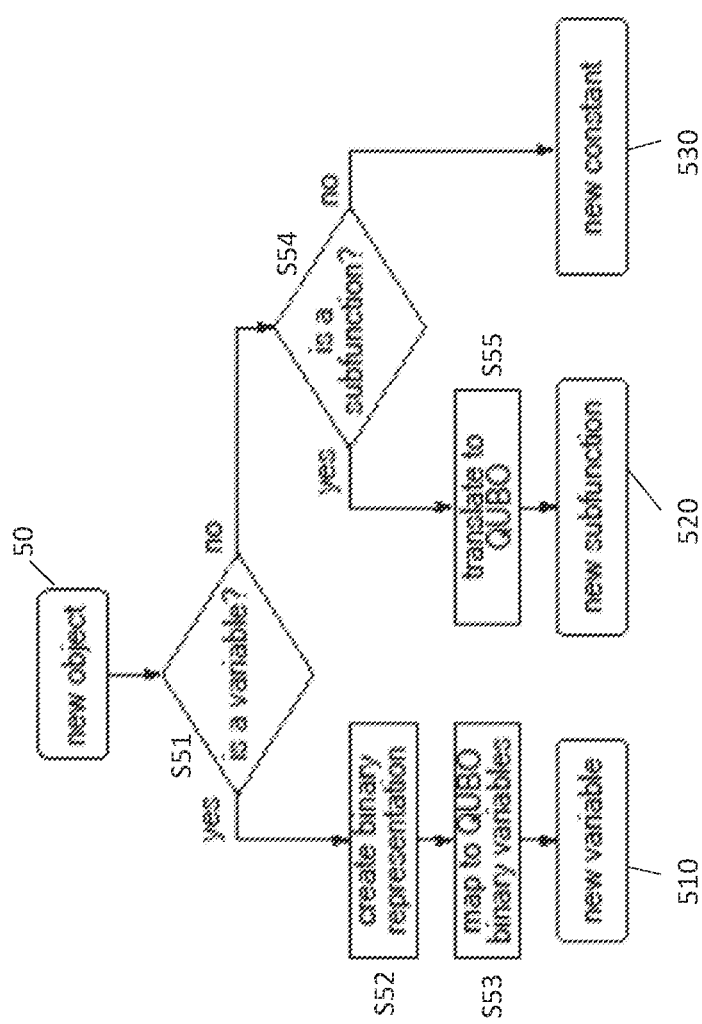
FIG. 5 is a flowchart illustrating a process for collecting the elements of a problem to be translated into QUBO.

If at operation S51 of the process illustrated in FIG. 5 it is decided that a new object 50 of the source code is a variable, then the process passes to operation S52 at which a binary representation is created. The object (variable) 50 is then mapped at operation S53 to QUBO binary variables to obtain a new variable 510. If at operation S51 it is decided that the object 50 is not a variable, then the process passes to operation S54 at which it is decided whether the object 50 is a subfunction or not. If the object 50 is a subfunction, then at operation S55 the object is translated into a QUBO representation to obtain a new subfunction 520. If it is decided at operation S54 that the object 50 is not a subfunction, the object 50 is determined to be a new constant 530.

QuboFunction object also accumulates the outputs of auxiliary functions, as described below with reference to FIG. 6, which is a flowchart illustrating a wrapper for calling a subfunction 520.

Figure 6:
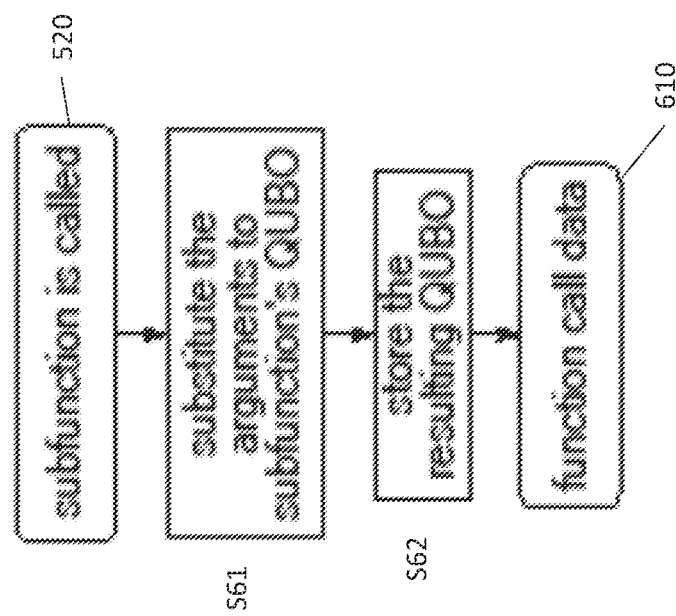
FIG. 6 is a flowchart illustrating a wrapper for calling a subfunction.

At operation S61 of the process illustrated in FIG. 6 the arguments are substituted to a QUBO representation generated for the called subfunction 520. At operation S62 the resulting QUBO representation is stored to obtain the function call data 610.

QuboFunction object also creates links between subfunctions' input and outputs, as described below with reference to FIG. 7, which is a flowchart illustrating a process for creating input/output links.

At operation S71 it is decided whether the output of subfunction 520 is used as input for another subfunction. If YES, the process passes to operation S72 at which an auxiliary variable and associated auxiliary penalty formula are created. At operation S73 the auxiliary penalty formula is stored and the new variable's formula is obtained (see algorithm 1 described below). If the subfunction's output is not used as input for another subfunction, at operation S74 the QUBO of the subfunction's output is added to the main QUBO (see algorithm 2 described below).

Figure 7:
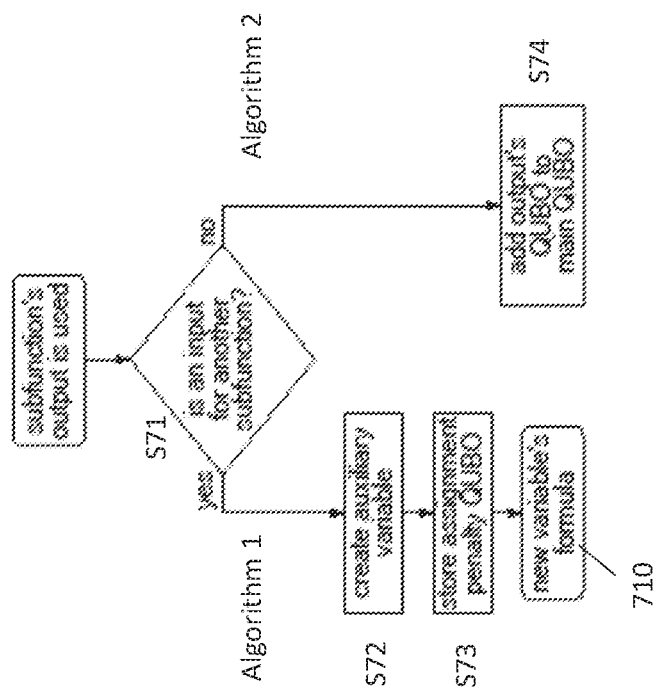
FIG. 7 is a flowchart illustrating a process for creating input/output links.

The processes of FIGS. 6 and 7 correspond to the tasks carried out by the input/output linking module 5. FIG. 6 relates to the procedure that happens when a sub-function is called and the output is generated. Here the data that are necessary for creating the link are generated. FIG. 7 on the other hand relates to the procedure where the data is used to make a link. The split of tasks between the two processes is a feature of the worked example in Python which is described below and it will be clear that in other circumstances it may be preferable to combine the tasks of FIGS. 6 and 7 into a single process.

QuboFunction object also extracts the QUBO representation.

Additionally, the QuboFunction object initializes a new BookKeeper instance when created. When the resulting QUBO is requested, a final post-processing procedure is first executed.

The description above is generic and may be implemented in many ways in various programming languages. For example, Python may provide the required functionality by
  accepting new attributes that are either variables or functions
  having a dedicated 'objective' attribute
  having a dedicated 'qubo' attribute Listing 1 below is an example of the interface in Python:

```
def user__objective(x: autoda.int8) -> autoda.int8:
    return x*13
new__qubo = autoda. QuboFunction( )
new__qubo.solution__variable = autoda.int8
new__qubo.user__objective = user__objective
new__qubo.objective +=
    new__qubo.user__objective(new__qubo.solution__variable)
return new__qubo.qubo
```

1.2 BookKeeper

The main purpose of the BookKeeper is to manage the mappings between high-level variables and binary variables in the QUBO representation. This includes both user-defined variables and auxiliary variables. In particular auxiliary variables will be created to store auxiliary function outputs, and in the process of linearization, as mentioned above.

The BookKeeper also performs final post-processing. In particular this includes optimizing the effects of linearization and introduction of auxiliary variables. As mentioned above, the conditions under which linearization and auxiliary variable creation occur are simplified in this embodiment, and the result is optimized in post-processing. This method allows modularity and makes the decision process during the process simpler.

The role of the post-processing optimization is to eliminate any inefficiency in the preliminary core QUBO formulation that was impossible to predict with certainty during the previous phases (when only one link was considered at a time) without gathering the complete information. In the worked example described below, post-processing optimization may include reversing the effects of linearization if it is proved to be unnecessary and reversing the introduction of auxiliary variables where they prove to be unnecessary. Also, if any relevant additional data is gathered during the previous phases, it may be used here.

It is convenient to linearize all quadratic coefficients that occur in the QUBO representation of an auxiliary function that is used as an input of another auxiliary function (see Algorithm 1 below). However, if the linearized coefficient is not actually used in the preliminary core QUBO formulation as the input to another function, the linearization was unnecessary. To avoid inefficiency this may be easily detected during post-processing, and quadratic coefficients that were linearized unnecessarily may be returned directly.

The same applies for creating auxiliary variables (see Algorithm 1 below). Creating an auxiliary variable for each of the auxiliary functions used as input makes it easier to automate. However, if it is detected that the created variable is only used in linear coefficients, the auxiliary variable may be substituted by the auxiliary function's QUBO directly.

1.3 AuxFunction

The auxiliary functions appear in three contexts. First, at the moment of the definition, when the link to the main QUBO object is established. Second, when the function is called by the user without the knowledge of how the output is used. Third, when the function is called from a Function-Call object, after gathering all the data about the context.

The result of the first stage is an interface for gathering arguments and creating FunctionCall instances, and passing compile requests to BookKeeper object.

At the second stage, the provided arguments are stored, to be used when the context for the output is known.

When the function is called and the output is used as input for another auxiliary function, algorithm 1, as follows, is executed:

---
Algorithm 1. Creating a wrapper for
an auxiliary function used as input.
---

Input
  aux_qubo - QUBO generator corresponding to the auxiliary function.
  args - Input variables, including the values of symbolic parameters.
    These may be binary mappings of the input variables given by the
    user, or auxiliary variables from linearization/previous runs of
    Algorithm 1.
  out_type - Output variable type.
Output A reference to the auxiliary variable that stores the computation result.

Procedure
1. Substitute the values of the symbolic parameters in the QUBO generator (aux_qubo) of the auxiliary function with the values given in the input "args".
2. Generate a QUBO representation Q for the function with the input variables.
3. If Q has non-zero quadratic terms, introduce additional auxiliary variables to reduce Q to a linear representation, and send the quadratic component resulting from the linearization (i.e. linearization "penalty function") to the BookKeeper object.
4. Introduce a further new variable a (=Q) to the core QUBO representation to store the result of the computation.
5. Generate a penalty component $(a-Q)^2$, i.e. define a new formula that is not a part of the core QUBO representation in view of the constraint a=Q.
6. Add the penalty component to the BookKeeper object.
7. (optional) Compute the auxiliary function value, and assign to the corresponding variable (this operation may be used to store data that might be of use later, during post-processing for example, in order to know more about the typical values of the variables, but it is never used here directly).
8. Return the auxiliary variable reference (e.g. the address in memory of the object), i.e. return the data needed to associate the output with the corresponding binary variables of the core QUBO representation.

When the function is called and the output is added to the objective, algorithm 2, as follows, is executed:

---
Algorithm 2. A wrapper for an auxiliary function
added to objective QUBO representation directly.
---

Input
  aux_qubo - QUBO generator corresponding to the auxiliary function.
  args - Input variables, including the values of symbolic parameters.
  out_type - Output variable type.
Output
  void Procedure
1. Substitute the values of the symbolic parameters in the QUBO generator (aux_qubo) of the auxiliary function with the values given in the input "args".
2. Generate a QUBO representation Q with the input variables.
3. (optional) Compute the auxiliary function value, and assign to the corresponding variable (as operation 7 of Algorithm 1).
4. Add the QUBO representation Q to the objective QUBO representation.

1.4 FunctionCall

Processing the output of an auxiliary function cannot be done without the knowledge of how is going to be used. For that reason a wrapper class for function calls is introduced. The purpose of the class is to store all of the information about the call for future use.

The class instances are initialized with a reference to the function called and the arguments provided.

An interface is provided for interaction with the Qubo-Function object for correctly adding the output to the objective function via the 'cost' attribute. In this case the function is compiled, and the formula is merged with the objective function's formula directly (see AuxFunction section, Algorithm 2).

Similarly an interface for using the output as an input to another auxiliary function is provided. In this case a new auxiliary variable has to be created, and all of the references (or alternatively, constraints requiring it to be equal to the output of the auxiliary function) created (see AuxFunction section, Algorithm 1).

Worked Example

Consider an optimization problem given by the following piece of Python code, assuming that the complete objective function is called 'objective':

```
def auxiliary1(x: autoda.int8) -> autoda.int8:
    return x**2
def auxiliary2(x: autoda.int8, y: autoda.int8) -> autoda.int8:
    return x * y
def objective(a, b):
    return auxiliary2(auxiliary1(x), y)
```

The function defined in the presented way is not in the form of a quadratic polynomial. Previously-proposed methods for translating code to QUBO representations will fail with such an input.

Assume that the objective is specified within a framework that allows a QUBO problem to be built from the components below:

```
new_qubo = autoda. QuboFunction( )
new_qubo.variable_a = autoda.int8
new_qubo.variable_b = autoda.int8
new_qubo.auxiliary1 = auxiliary1
new_qubo.auxiliary2 = auxiliary2
partial_solution = new_qubo.auxiliary1(new_qubo.variable_a)
total_value = new_qubo.auxiliary2(partial_solution,
    new_qubo.variable_b)
new_qubo.objective += total_value
return new_qubo.qubo
```

This representation may be transformed into QUBO using an embodiment, as described below.

First, the BookKeeper object is given information about solution variables. This is done by defining new data types for all supported types of variables, and assigning them as new attributes to the qubo object. When a user sets a new attribute, from the information provided the data that will be used in the process of building the QUBO later may be extracted (for example, by overloading the _setattr_ method in a Python class it is possible to intercept the given types and their labels for future use). The important information to extract here is the variables' names (labels) and their types.

new_qubo.variable_$a$=autoda.int8 new_qubo.variable_$b$=autoda.int8

Because the QUBO variables are binary, the BookKeeper object keeps track of the assignments, namely variable_$a$=[$b_1$, ... ,$b_8$]

variable_$b$=[$b_9$, ... ,$b_{16}$],

Additionally the weights are stored $w$=[1,2,$2^2$, ... ,$2^7$,1,2, ... ,$2^7$]

Then each of the auxiliary functions is translated into QUBO independently. Again, by overloading the _setattr_ method in a Python class, all functions given as new attributes may be intercepted. Then any appropriate method may be applied to translate the components, as long as they are quadratic.

new_qubo.auxiliary1=auxiliary1 new_qubo.auxiliary2=auxiliary2

After this operation an internal representation of 'auxiliary1' and 'auxiliary2' is stored.

$$f_{auxiliary1}(x_1, \ldots, x_8) = x_1 x_1 + 2*2^1 x_1 x_2 + 2*2^2 x_1 x_3 + \ldots + 2^{14} x_8 x_8,$$

$$f_{auxiliary2}(x_1, \ldots, x_{16}) = x_1 x_9 + 2 x_1 x_{10} + \ldots + 2^{14} x_8 x_{16},$$

Next, the components have to be joined into a single QUBO. For that purpose the user may simply call the previously defined function. At this stage, it is not known how the output is used. Thus, a FunctionCall class is used to store the arguments and function reference.

At this stage the generic input variables of $f_{auxiliary1}$ are substituted by the corresponding bits ($b_1, \ldots, b_8$) assigned to variable_a:

partial_solution=new_qubo.auxiliary1(new_ qubo.variable_$a$)

When the input of an auxiliary function is a previously-stored instance of FunctionCall, the link between the components is established. In this example the AuxFunction instance (the decorator) corresponding to the 'auxiliary2' function gets a FunctionCall object (that is, the object is given as input instead of a variable). In this case Algorithm 1 is used, as the output has to be stored in an auxiliary function $f_{aux1}$ and transformed into a linear sub-function:

total_value=new_qubo.auxiliary2(partial_solution, new_qubo.variable_$b$)

Thus a new variable $aux_1$=partial_solution is created, and the corresponding bits are assigned:

$aux_1$=($b_{17}, \ldots, b_{24}$)

The value of partial_solution becomes a reference to the new auxiliary variable formula $f_{aux1}$ such that $f_{aux1}$=($b_{17}$+2$b_{18}$+4$b_{19}$ ... ), making sure that it is linear.

The penalty QUBO part $$(f_{aux1} - f_{auxiliary1}(b_1, \ldots, b_8))^2$$

is passed to the BookKeeper object.

When the output of a function is added directly to the objective function, Algorithm 2 is used to turn total_value into a formula that is correct in the given context new_qubo.objective+=total_value In this case, the formula obtained from the translation method does not need to be changed. Thus, after putting the correct input in place, the obtained formula is $$f_{auxiliary2}(b_{17}, \ldots, b_{24}, b_9, \ldots, b_{16})$$

Finally, the resulting QUBO representation is requested.
return new_qubo.qubo

By overloading _getattr_ method the post-processing procedure may be called before returning the result. In this case only one auxiliary variable ($aux_1$) that was introduced needs to be optimised.

FIG. 8 is a block diagram of a computing device, such as a data storage server, which embodies the present invention, and which may be used to implement some or all of the operations of a method embodying the present invention, and perform some or all of the tasks of apparatus of an embodiment. For example, the computing device of FIG. 8 may be used to implement all the tasks of the data input apparatus 100 illustrated in FIG. 1B and perform all the operations of the method shown in FIG. 1A, or only to implement one or more of the processes described with reference to FIGS. 1A, 2, 5, 6 and/or 7.

The computing device comprises a processor 993 and memory 994, which may for example serve respectively as processor 10 and memory 20 of data input apparatus 100. Optionally, the computing device also includes a network interface 997 for communication with other such computing devices, for example with other computing devices of invention embodiments and/or information processing apparatus 200.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. For example, the computer-executable instructions may include those instructions for implementing all the tasks or functions to be performed by each or all of the various modules in the architecture 1000 illustrated in FIG. 2, or performing all the operations of the method shown in FIG. 1A, or only to implement one or more of the processes described with reference to FIGS. 1A, 2, 5, 6 and/or 7. And such instructions may be executed by one or more processor 993. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing computer program code stored in the memory 994 to implement the methods described with reference to FIGS. 1A, 2, 5, 6 and/or 7 and defined in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and operations discussed herein.

The display unit 995 may display a representation of data stored by the computing device and may also display a cursor and dialog boxes and screens enabling interaction between a user and the programs and data stored on the computing device. The input mechanisms 996 may enable a user to input data, such as the source code to be processed, and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

Methods embodying the present invention may be carried out on a computing device such as that illustrated in FIG. 8. Such a computing device need not have every component illustrated in FIG. 8, and may be composed of a subset of those components. A method embodying the present invention may be carried out by a single computing device in communication with one or more data storage servers via a network. The computing device may be a data storage itself storing at least a portion of the data.

A method embodying the present invention may be carried out by a plurality of computing devices operating in cooperation with one another. One or more of the plurality of computing devices may be a data storage server storing at least a portion of the data.

The above-described embodiments of the present invention may advantageously be used independently of any other of the embodiments or in any feasible combination with one or more others of the embodiments.

What is claimed is:

1. A computer-implemented method of automatically inputting code into an information processing apparatus, the information processing apparatus requiring input code to be in a predefined polynomial format of order k, where k≥2, the computer-implemented method comprising:
receiving source code for input into the information processing apparatus;
translating the source code into a polynomial of order k, where each subfunction of the source code is translated into a new subfunction independently of each other subfunction of the source code;
analyzing the source code to extract information about types of decision variables in the source code, applying an encoding to each of the decision variables, and obtaining mappings between the encoded variables and variables of the polynomial;

extracting from the source code and new subfunctions an expression representing interrelationships between the decision variables and the new subfunctions;

generating a corresponding first polynomial portion for each new subfunction where an output of the new subfunction is not an input for another of the new subfunctions;

generating a corresponding second polynomial portion for each new subfunction where the output of the new subfunction is the input for another of the new subfunctions, wherein:

when a second polynomial portion generated for the new subfunction has any term of order higher than floor(k/2), that term in the second polynomial portion is reduced in order to floor(k/2), and an associated order reduction penalty of order k is generated; and an auxiliary variable equal to the second polynomial portion is created to store an output of the second polynomial portion, and an associated auxiliary penalty of order k is generated; and obtaining a polynomial formulation for input into the information processing apparatus by accumulating first polynomial portions, together with any auxiliary variables and associated auxiliary penalties and any order reduction penalties, using the extracted expression and mappings to link the new subfunctions of the polynomial to the decision variables in the source code.

2. The computer-implemented method as claimed in claim 1, wherein the obtaining of the polynomial formulation includes removing any unnecessary inefficiencies in the polynomial formulation.

3. The computer-implemented method as claimed in claim 2, wherein the removing of any unnecessary inefficiencies comprises:

ascertaining whether any auxiliary variable created to store the output of the second polynomial portion is used in the polynomial formulation only in a term of order lower than or equal to floor(k/2), and replacing any such auxiliary variable and associated auxiliary penalty in the polynomial formulation by the corresponding second polynomial portion.

4. The computer-implemented method as claimed in claim 2, wherein the removing of any unnecessary inefficiencies comprises:

ascertaining whether any reduced order term in the second polynomial portion is not used in the polynomial formulation as an input to another term, and replacing any reduced order term that is not used and associated order reduction penalty in the polynomial formulation by the corresponding higher order term.

5. The computer-implemented method as claimed in claim 1, wherein the source code represents an optimization problem.

6. The computer-implemented method as claimed in claim 5, wherein the information processing apparatus is an Ising machine.

7. The computer-implemented method as claimed in claim 1, wherein k=2 and the predefined polynomial format is a Quadratic Unconstrained Binary Optimization formulation.

8. A non-transitory computer-readable storage medium storing computer executable instructions to cause a computer processor to carry out the computer-implemented method of claim 1.

9. A data input apparatus to automatically input code into an information processing apparatus, the information processing apparatus requiring input code to be in a predefined polynomial format of order k, where k≥2, the data input apparatus comprising:

at least one processor to receive source code for input into the information processing apparatus; and at least one memory to store instructions to cause the at least one processor to:

translate the source code into a polynomial of order k, where each subfunction of the source code is translated into a new subfunction independently of each other subfunction of the source code;

analyze the source code to extract information about types of decision variables in the source code, apply an encoding to each of the decision variables, obtain mappings between the encoded variables and variables of the polynomial, and store the extracted information and mappings in the at least one memory;

extract from the source code and new subfunctions an expression representing interrelationships between the decision variables and the new subfunctions, and store the extracted expression in the at least one memory;

generate a corresponding first polynomial portion for each new subfunction, where an output of the new subfunction is not an input for another of the new subfunctions, and store the generated first polynomial portion in the at least one memory, generate a corresponding second polynomial portion for each new subfunction, where the output of the new subfunction is the input for another of the new subfunctions, and store the generated second polynomial portion in the at least one memory, wherein:

when a second polynomial portion generated for the new subfunction has any term of order higher than floor(k/2), that term in the second polynomial portion is reduced in order to floor(k/2), and an associated order reduction penalty of order k is generated and stored in the at least one memory; and an auxiliary variable equal to the second polynomial portion is created to store an output of the second polynomial portion, an associated auxiliary penalty of order k is generated, and the auxiliary variable and associated auxiliary penalty are stored in the at least one memory; and obtain a polynomial formulation for input into the information processing apparatus by accumulating stored first polynomial portions, together with any stored auxiliary variables and associated auxiliary penalties and any stored order reduction penalties, using the stored extracted expression and mappings to link the new subfunctions of the polynomial to the decision variables in the source code.

10. The data input apparatus as claimed in claim 9, wherein, in the obtaining of the polynomial formulation, the at least one processor removes any unnecessary inefficiencies in the polynomial formulation.

11. The data input apparatus as claimed in claim 10, wherein the at least one processor ascertains whether any auxiliary variable created to store the output of the second polynomial portion is used in the polynomial formulation only in a term of order lower than or equal to floor(k/2), and replaces any such auxiliary variable and associated auxiliary penalty in the polynomial formulation by the corresponding second polynomial portion.

12. The data input apparatus as claimed in claim 10, wherein the at least one processor ascertains whether any reduced order term in the second polynomial portion is not used in the polynomial formulation as an input to another term, and replaces any reduced order term that is not used and associated order reduction penalty in the polynomial formulation by the corresponding higher order term.

13. The data input apparatus as claimed in claim 9, wherein the source code represents an optimization problem.

14. The data input apparatus as claimed in claim 13, wherein the information processing apparatus is an Ising machine.

15. The data input apparatus as claimed in claim 9, wherein k=2 and the predefined polynomial format is a Quadratic Unconstrained Binary Optimization formulation.

* * * * *